United States Patent [19]

Carcia

[11] 4,355,873

[45] Oct. 26, 1982

[54] PHOTOGRAPHIC CONTROL SYSTEM FOR VARYING BOTH FLASH FIRE APERTURE AND EXPOSURE TERMINATION IN CORRESPONDENCE WITH FILM SPEED

[75] Inventor: Peter P. Carcia, Reading, Mass.

[73] Assignee: Polaroid Corporation, Cambridge, Mass.

[21] Appl. No.: 271,579

[22] Filed: Jun. 8, 1981

[51] Int. Cl.³ .................. G03B 7/097; G03B 7/16
[52] U.S. Cl. ........................ 354/27; 354/28; 354/29; 354/137; 354/139
[58] Field of Search ............ 354/26, 27, 28, 29, 354/30, 32, 34, 137, 139, 149

[56] References Cited

U.S. PATENT DOCUMENTS

| | | | |
|---|---|---|---|
| 3,478,660 | 11/1969 | Land | 95/11.5 |
| 3,620,143 | 11/1971 | Burgarella | 95/10 C |
| 3,868,704 | 2/1975 | Yamada et al. | 354/50 |
| 3,879,118 | 4/1975 | Kiyohara et al. | 354/24 |
| 3,942,183 | 3/1976 | Whiteside | 354/29 |
| 3,977,014 | 8/1976 | Norris | 354/196 |
| 4,023,187 | 5/1977 | Shenk | 354/27 |
| 4,040,072 | 8/1977 | Johnson et al. | 354/173 |
| 4,167,316 | 9/1979 | Johnson et al. | 354/197 |
| 4,192,587 | 3/1980 | LaRocque et al. | 354/27 |
| 4,199,246 | 4/1980 | Muggli | 354/195 |
| 4,208,112 | 6/1980 | Plummer | 354/42 |
| 4,229,088 | 10/1980 | Yuasa et al. | 354/23 D |
| 4,251,141 | 2/1981 | Stemme et al. | 354/23 D |

Primary Examiner—Michael L. Gellner
Attorney, Agent, or Firm—Edward S. Roman

[57] ABSTRACT

In a photographic exposure control system of the type which provides a flash fire signal at an appropriate follow focus aperture value corresponding to the camera-to-subject distance range and which terminates the exposure interval as a function of scene light detection and integration to a select level, there is provided an arrangement by which the exposure control system may be selectively adjusted to accommodate any one of a variety of different film speeds.

9 Claims, 7 Drawing Figures

PHOTOGRAPHIC CONTROL SYSTEM FOR VARYING BOTH FLASH FIRE APERTURE AND EXPOSURE TERMINATION IN CORRESPONDENCE WITH FILM SPEED

BACKGROUND OF THE INVENTION

1. Field of the Invention

This invention relates generally to a photographic exposure control system for simultaneously varying both flash fire aperture and scene light integration level in correspondence with different film speeds and, more particularly, to a photographic exposure control system for simultaneously varying the follow focus aperture at which the flash is fired and the integration level to which the scene light is integrated and which the exposure is terminated in correspondence with different film speeds.

2. Description of the Prior Art

In the photographic art, exposure control systems embodying scanning shutter blade elements which operate to vary exposure areas with time during the exposure interval are well known as indicated by U.S. Pat. No. 3,942,183, entitled "Camera with Pivoting Blades", by George D. Whiteside, issued Mar. 2, 1976, in common assignment herewith. Such scanning shutter blade mechanisms generally include a pair of counter-reciprocating blade elements, each having a primary aperture that traverses the optical axis of the camera during the exposure interval. The primary aperture is shaped so that upon overlying one another during countermovement of the blades, there is defined an effective exposure aperture value which increases to a maximum value in a determined period of time.

Exposure control is provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching in integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems, and the maximum aperture to which the scanning shutter blade elements are allowed to open is controlled by the rangefinding or focusing system of the camera in a manner as in more fully disclosed in U.S. Pat. No. 3,977,014, entitled "Follow Focus Exposure Control System with Improved Uniform Trim Control", by Philip R. Norris, issued Aug. 24, 1976, in common assignment herewith.

Such a system need not actually stop the opening shutter blade movement at a maximum effective aperture as determined by the rangefinding or focusing system of the camera but may, instead, vary the time at which the strobe light is fired during the opening shutter blade movement as determined in correspondence with the rangefinding or focusing system of the camera. Since the duration of the strobe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs under conditions of low ambient scene light intensity. Such a system is more fully described in U.S. Pat. No. 3,478,660, entitled "Photographic Apparatus for Flash Exposure Control System", by Edwin H. Land, issued Nov. 18, 1979, in common assignment herewith. Range responsive flash firing systems of the aforementioned type can also be utilized in conjunction with sonar rangefinding devices as is more fully described in U.S. Pat. No. 4,167,316, entitled "Sonar Controlled Lens Focus Apparatus", by Bruce K. Johnson et al., issued Sept. 11, 1979, in common assignment herewith.

Exposure and artificial illumination control systems of the aforementioned type are generally intended to provide a source of artificial illumination only during a low ambient scene light intensity mode of operation. However, there may also be conditions during high ambient scene light intensity modes of operation where it becomes desirable to provide artificial illumination to fill in the photographic subject against a brightly backlit scene as is more fully disclosed in U.S. Pat. No. 4,023,187, entitled "Exposure Control System with Fill Flash Race Condition", by Edwin K. Shenk, issued May 10, 1977, in common assignment herewith. The aforementioned artificial illumination control system operates under conditions of low ambient scene light intensity to fire the strobe light at a predetermined time period subsequent to the initiation of the exposure interval and under conditions of high ambient scene light intensity to fire the strobe as a consequence of the time integration of the scene light intensity incident to the photoresponsive element reaching a predetermined value. This fill flash system, however, fails to provide a select ratio between that portion of the exposure which is directly attributable to artificial scene illumination and the remaining portion of the exposure which is directly attributable to ambient scene light illumination over a determinate range of camera-to-subject distances.

More recently, a photographic exposure and flash fire control system as disclosed in U.S. Pat. No. 4,192,587, entitled "Proportional Fill Flash", by Arthur G. LaRocque et al., issued Mar. 11, 1980, in common assignment herewith, provided for the firing of a strobe in a fill flash mode of operation in a manner whereby a select ratio may be maintained between that proportion of the exposure which is directly attributable to the artificial scene illumination and the remaining proportion of the exposure which is directly attributable to the ambient scene light illumination. Such a select proportional fill flash is accomplished by providing means whereby the light integration control circuit discounts the artificial illumination provided by the strobe.

Toward this end, this system includes a sample and hold circuit which operates to sample the output voltage from a photoresponsive element and to transfer the sampled output voltage directly to a light integrating circuit. However, upon the firing of the strobe, the sample and hold circuit operates to hold the sampled voltage immediately prior to the firing of the strobe and to apply the sampled voltage to the light integrating circuit for the duration of the strobe pulse.

Cameras of the aforementioned type, however, are designed for use with only one film speed and do not have provision for adjustment to accommodate any other film speeds other than that film speed for which the camera is specifically designed.

Therefore, it is a primary object of this invention to provide cameras of the aforementioned type with means by which the cameras may be selectively adjusted to accommodate a variety of select film speeds.

It is a further object of this invention to provide cameras of the type wherein the flash is automatically fired at the appropriate follow focus aperture with selectively actuatable means for accommodating a variety of different film speeds.

It is a further object of this invention to provide cameras of the type wherein the flash is fired at the appropriate follow focus aperture corresponding to camera-to-subject distance and wherein the exposure is controlled in an automatic manner by integrating the scene light to a select level at which the exposure interval is terminated with a selectively adjustable means for accommodating a variety of different film speeds.

Other objects of the invention will be in part obvious and will in part appear hereinafter. The invention accordingly comprises a mechanism possessing a construction, combination of elements and arrangement of parts which are exemplified in the following detailed disclosure.

SUMMARY OF THE INVENTION

In a photographic exposure control system for use with a source of artificial illumination and for controlling the exposure of a photosensitive recording medium of the type having a shutter arrangement for at least initially providing progressively increasing aperture values at a predetermined rate during an exposure interval within which scene light is transmitted to the photosensitive medium following actuation of the shutter arrangement, and means for providing a flash fire signal to ignite the source of artificial illumination during the exposure interval at an appropriate follow focus aperture corresponding to the subject distance, there is provided an improvement comprising selectably actuatable means for varying the follow focus aperture at which the flash fire signal is provided in correspondence with different ones of a select plurality of film speeds. The photographic exposure control system may additionally include means for detecting scene light and for responding to the detection of a select amount of scene light to terminate the exposure interval, in which case, the improvement further includes means for also varying the select amount of scene light to be detected in order to terminate the exposure interval in correspondence with different ones of the select plurality of film speeds. The exposure control means may also include means for determining the distance of a photographic subject from the system to define a range related time interval corresponding to the select subject distance and for producing a flash fire signal responsive to a lapse of a time period commencing at the initiation of the exposure interval corresponding to the range related time interval. The flash fire signal is thus produced at an aperture value corresponding to the subject distance. Under these conditions the means for selectively varying the follow focus aperture at which the flash fire signal is provided specifically operates to vary the lapsed time period at which the flash fire signal is provided in correspondence with different ones of the select plurality of film speeds.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiments when read in connection with the accompanying drawings wherein:

DESCRIPTION OF THE PREFERRED EMBODIMENTS

Referring now to FIGS. 1 through 4, there are shown generally at 10 a photographic exposure control shutter apparatus disposed about a baselock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens arrangement or assembly as shown schematically in FIG. 5 at 108 is provided in overlying relation with respect to the light entry opening 14. Image carrying rays from the objective lens arrangement 108 which are transmitted by the shutter apparatus 10 in a manner to be subsequently described are thereafter directed to a rearwardly positioned film plane (not shown) by way of a reflecting mirror (also not shown) all of which are stationed within a suitable light-tight film exposure chamber (also not shown) in a manner as is more fully described in U.S. Pat. No. 4,040,072, entitled "Shutter Latch Arrangement Releasable Through Shutter Base Actuation and Resettable Through Film Advancement", by Bruce K. Johnson et al., issued Aug. 2, 1977, in common assignment herewith and now incorporated by reference herein.

The exposure control shutter apparatus 10 comprises two overlapping shutter blade elements 16 and 18 of the so-called scanning type which will be subsequently described in greater detail herein. A pair of scene light admitting primary apertures 20 and 22 are provided, respectively, in the blade elements 16 and 18 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera With Pivoting Blades", by George D. Whiteside, issued Mar. 2, 1977, in common assignment herewith and now incorporated by reference herein. The apertures 20 and 22 are selectively positioned so as to overlap the light entry exposure opening 14 thereby defining a gradually varying effective aperture size as a function of the position of the blade elements 16 and 18.

Figure 1:
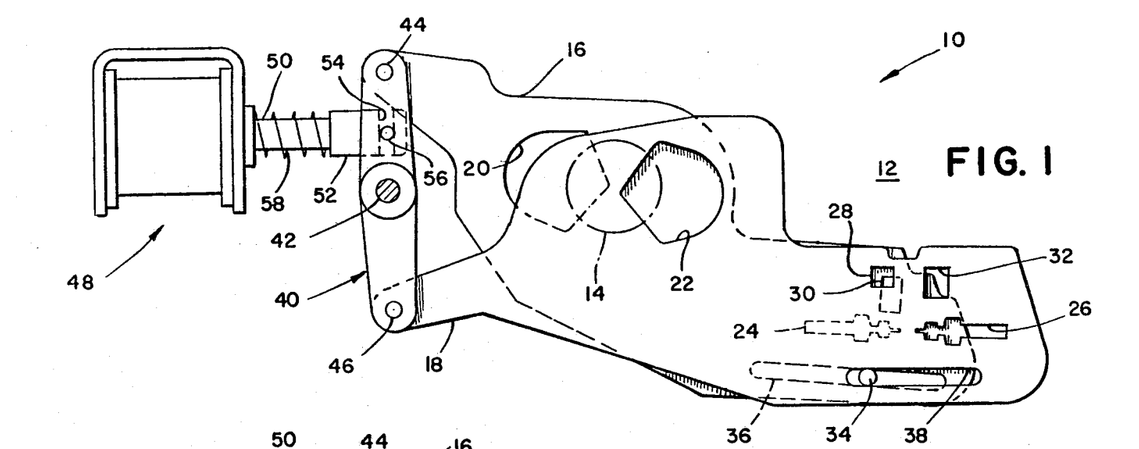
FIG. 1 is a front elevational view showing portions of an exposure control system embodying the improvement of this invention.
Figure 2:
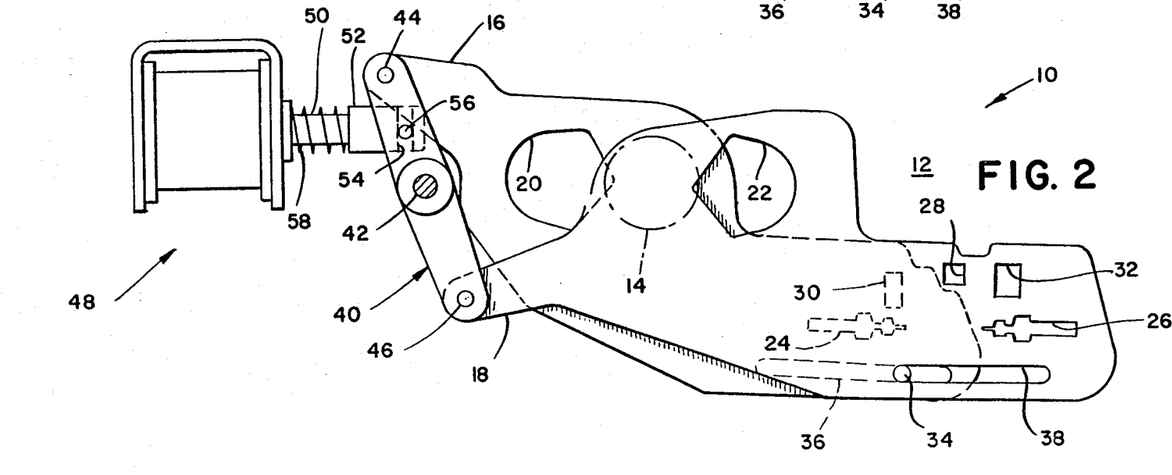
FIG. 2 is a front elevational view showing portions of the exposure control system of FIG. 1 in a different position.

Each of the blades 16 and 18 is additionally configured to have corresponding photocell sweep secondary aperture shown, respectively, at 24 and 26. The photocell sweep secondary apertures 24 and 26 may be configured to track in a predetermined corresponding relationship with respect to the scene light admitting primary apertures 20 and 22. As is readily apparent, the photocell sweep secondary apertures 24 and 26 move in the same manner as the primary apertures 20 and 22 to define a small secondary effective aperture for admitting the passage of scene light transmitted to a photoresponsive element 62 (see FIG. 5) from the scene being photographed. The blades 16 and 18 also include, respectively, a third pair of first light detect apertures 30 and 32 which operate in a manner to be subsequently described to admit light from a source of artificial illumination such as an LED 33, as also shown in the circuit diagram of FIG. 5, to the photoresponsive element 62 in coincidence with the first light admitted to the film plane when the primary apertures 20 and 22 initially overlap at the commencement of an exposure interval. The shutter blade element 18 also includes a pre-exposure ambient scene light detect aperture 28 which is moved out of overlapping relationship with the edge of the shutter blade 16 to admit ambient light to the photoresponsive element 62 when the shutter blade elements 16 and 18 are moved to the position as shown in FIG. 2 to accommodate a pre-exposure ambient scene light measurement as disclosed in U.S. Pat. No. 4,192,587, entitled "Proportional Fill Flash", by Arthur G. LaRocque et al., issued Mar. 11, 1980, in common assignment herewith and now incorporated by reference herein.

Projecting from the baselock casting 12 at a location spaced laterally apart from the light entry exposure opening 14 is a pivot pin or stud 34 which pivotally and translatably engages elongate slots 36 and 38 formed in respective shutter blade elements 16 and 18. Pin 34 may be integrally formed with the baseblock casting 12 and blade elements 16 and 18 may be retained in engaging relation with respect to the pin 34 by any suitable means such as peening over the outside end of the pin 34.

The opposite ends of the blade elements 16 and 18 respectively include extended portions which pivotally connect to a walking beam 40. The walking beam 40, in turn, is disposed for rotation relative to the baseblock casting 12 by pivotal connection to a projecting pivot pin or stud 42 which may be integrally formed with the baseblock casting 12 at a location spaced laterally apart from the light entry exposure opening 14. The walking beam 40 may be pivotally retained with respect to the pin 42 by any conventional means such as an E ring (not shown). In the preferred mode, the walking beam 40 is pivotally connected at its distal ends to the shutter blade elements 16 and 18 by respective pin members 44 and 46 which extend laterally outward from the walking beam 40. Pin members 44 and 46 are preferably circular in cross section and extend through respective circular openings in respective shutter blade elements 16 and 18. Thus, the shutter blade elements 16 and 18 provide a blade mechanism with the means for mounting the blade mechanism for movement being provided by the walking beam 40 together with the pivot pin 34.

Drive means are provided for displacing the blade mechanism and include a tractive electromagnetic device in the form of a solenoid 48 employed to displace the shutter blades 16 and 18 with respect to each other and the baseblock casting 12. The solenoid 48 includes an internally disposed cylindrical plunger unit 50 which retracts inwardly into the body of the solenoid upon energization of the solenoid winding. The solenoid plunger 50 includes an end cap 52 at the outside end thereof together with a vertical slot or groove 54 within the end cap for loosely engaging a pin 56 extending outwardly from the walking beam 40. In this manner, the solenoid plunger 50 is affixed to the walking beam 40 so that longitudinal displacement of the plunger 50 will operate to rotate the walking beam about the pivot pin 40 so as to appropriately displace the shutter blades 16 and 18. The drive means may additionally include a helical compression spring 58 around the plunger 50 so as to continuously urge the end cap 52 outwardly of the solenoid 48, thereby also continuously urging the blade elements 16 and 18 into positions defining the largest effective primary aperture over the light entry exposure opening 14. As will be readily understood, in some shutter blade arrangements it may be preferable to utilize a tension spring in place of the compression spring 58 in a manner as is shown in U.S. Pat. No. 3,942,183, supra. Thus, with the spring connection herein described, the exposure control blade apparatus 10 is biased to continuously urge the shutter blade elements 16 and 18 into an open scene light unblocking orientation as shown in FIG. 4.

Figure 4:
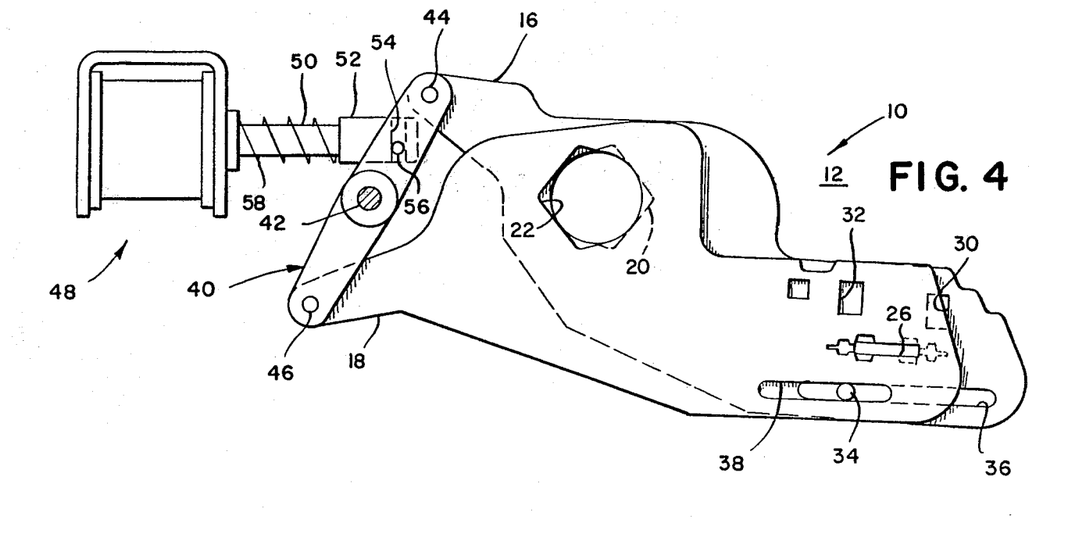
FIG. 4 is a front elevational view showing portions of the exposure control system of FIG. 1 in still a different position.

In the present arrangement, the shutter blades 16 and 18 are drawn from their scene light unblocking open arrangement as shown in FIG. 4 to their scene light blocking closed arrangement as shown in FIGS. 1 and 2 when the solenoid 48 is energized. Consequently, energization of the solenoid 48 prevents the shutter blades 16 and 18 from moving towards their maximum effective primary aperture defining arrangement under the urging of compression spring 58. However, it should be readily understood that the exposure control system of this invention would be equally applicable to photographic systems where the blades 16 and 18 are spring biased in a normally closed position. However, since in the preferred embodiment the shutter blade elements 16 and 18 are spring biased to move toward their scene light unblocking arrangement, it would otherwise be necessary to maintain the solenoid in a state of continued energization in order to hold the shutter blade elements 16 and 18 in their scene light blocking arrangement as shown in FIG. 1. Such continued energization of the solenoid 48, however, would present an intolerable power drain on the camera battery, particularly if the solenoid 48 had to be continuously energized even when the camera apparatus were not in use. In order to avoid this continued energization of the solenoid 48, there is provided a latch mechanism (not shown) which operates normally to latch the shutter blade mechanism in its scene light blocking arrangement as shown in FIG. 1 and which automatically unlatches the shutter blade mechanism to permit the shutter blade elements 16 and 18 to be moved to their scene light unblocking arrangement as shown in FIG. 4 in order to commence a photographic exposure cycle and which further automatically responds at the termination of an exposure cycle to relatch the blade elements 16 and 18 in their scene light blocking arrangement so as to permit deenergization of the solenoid 48. The manner in which the aforementioned latch operates is more fully described in U.S. Pat. No. 4,040,072, supra.

Figure 5:
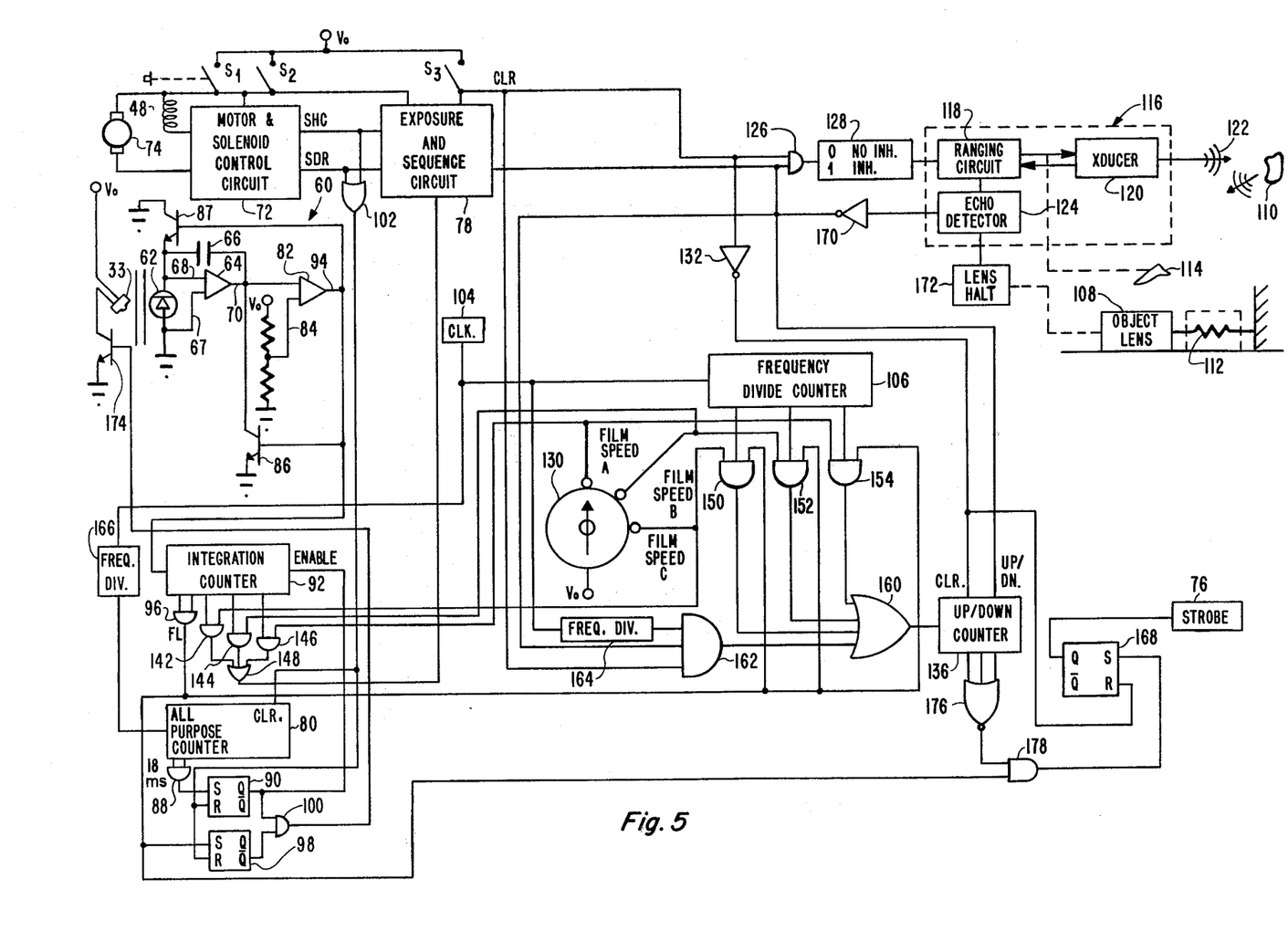
FIG. 5 is a schematic circuit diagram of an exposure and flash fire control system embodying the improvement of this invention.

Referring now to FIG. 5, there is shown a schematic diagram for the preferred embodiment of an exposure control system embodying the features of this invention for operation in a manner now to be described. The objective lens arrangement or assembly, as shown in simplified fashion at 108, is disposed for movement between a plurality of different focal positions. During each film exposure operation, the objective lens assembly 108 is displaced to one of its focal positions for focusing at the focal plane, image forming light rays from a respective photographic subject as shown at 110 located within a given range of distances from the camera apparatus. As is readily apparent, the lens assembly 108 is adapted at each of its plurality of focal positions to focus at the focal plane of the camera, an image of a photographic subject located at a different distance from the camera within the given range of distances.

The lens assembly 108 is biased to move through its plurality of different focal positions by a tension spring 112 and may be held at an initial terminal position as shown in solid lines by a releasable latch 114. The spring 112 operates to bias the lens assembly 108 to move toward another terminal position as shown by the phantom lines. The lens assembly 108 while in its initial terminal position (solid lines), operates to focus image forming light rays from a photographic subject located at the closest possible distance to the camera within the aforementioned camera-to-subject distance range and while in its other terminal position (phantom lines) operates to focus image forming light rays from a photographic subject located at the furthest possible distance from the camera within the aforementioned camera-to-subject distance range. The movement of the lens assembly 108 from its initial terminal position towards its other terminal position operates to progressively focus image forming rays from corresponding subjects located at progressively increasing distances from the camera.

The photographic apparatus is also provided with a sonic rangefinder as shown generally at 116 and which is more fully disclosed in U.S. Pat. No. 4,199,246, entitled "Ultrasonic Ranging System For a Camera", by J. Muggli, issued Apr. 22, 1980 and U.S. Pat. No. 4,167,316, entitled "Sonar Controlled Lens Focus Apparatus", by Bruce K. Johnson et al., issued Sept. 11, 1979, in common assignment herewith and now incorporated by reference herein. The sonic rangefinder 116 includes a ranging circuit 118 which may be actuated in a manner to be herein described to issue a transmit commence signal to a sonic transducer 120 so as to cause the transmission of a sonar ranging signal comprising a burst of sonic energy as shown at 122. The transducer 120 thereafter operates to detect an echo signal reflected from the photographic subject 110 at an elapsed time interval subsequent to the transmission of the sonar ranging signal. An echo signal detector 124 then provides a signal indicative of this elapsed time period which corresponds directly to the distance between the camera and the subject 110 to be photographed. Thus, the sonic rangefinder 116 provides a range related time interval which corresponds directly to the distance between the camera and the subject to be photographed for reasons which will become more apparent in the following discussion.

As shown generally at 60 in FIG. 5, there is provided a scene light detecting and integrating circuit comprising the photoresponsive element 62 connected across the input terminals 67 and 68 of an operational amplifier 64 of the differential variety. When considered ideally, the amplifier 64 has an infinite gain and an infinite input impedance and a zero output impedance. The input circuit of the amplifier 64, however, is structured such that the apparent input impedance for the photoresponsive element 62 is substantially zero, thereby functioning in a manner which permits the photoresponsive element 62 to operate in a current mode. Consequently, the current generated by the photoresponsive element 62 is limited substantially only to its own internal impedance. To accomplish this effect, a feedback integration capacitor 66 is connected between one input terminal 68 of the operational amplifier 64 and an output terminal 70 from the operational amplifier 64.

With the integration feedback arrangement herein described, any difference of potential supplied by the photoresponsive element 62 across input terminals 67 and 68 will operate to cause a current of opposite polarity to be produced through feedback integration capacitor 66. As a consequence, the feedback integration capacitor 66 provides a substantially instantaneous feedback signal of opposite polarity which serves to counteract any differential signal voltage impressed by the photoresponsive element 62 across the input terminals 67 and 68. Thus, although the amplifier 64 has a very high input impedance, the photoresponsive element 62, when connected in the aforementioned manner, experiences only a very low input impedance to the amplifier 64. Therefore, the current output of the photoresponsive element 62 is directed into the feedback integration capacitor 66. In this manner, the photoresponsive element 62 is connected to operate in a constant current mode of operation under conditions of nonvarying scene light intensity to provide a substantially linear output response at an output terminal 70 as more fully described in U.S. Pat. No. 3,620,143, entitled "Automatic Exposure Control System With Fast Linear Response", by John P. Burgarella, issued Nov. 16, 1971, in common assignment herewith and now incorporated by reference herein in its entirety.

Figure 6:
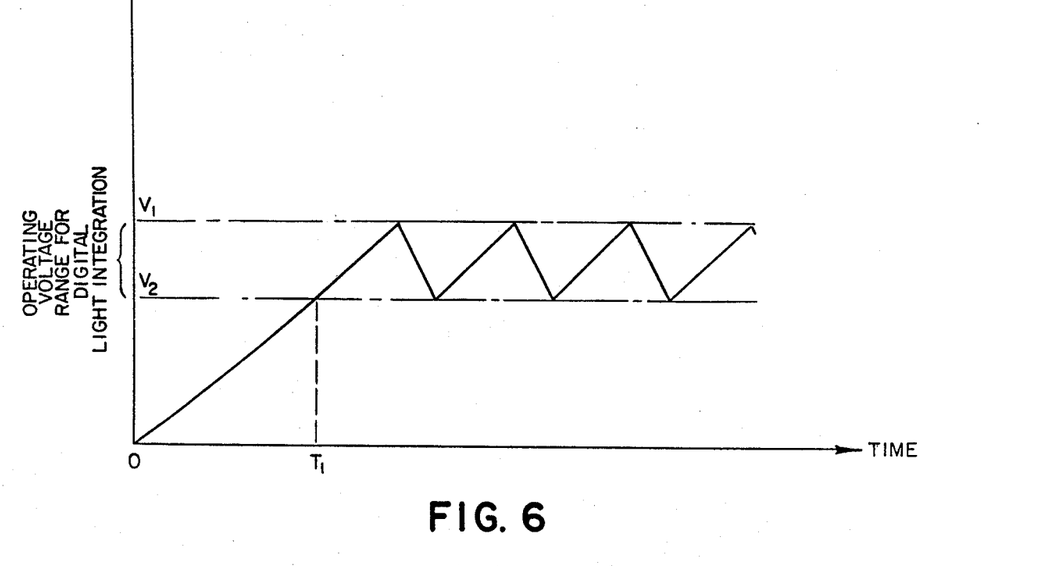
FIG. 6 is a graphical representation showing the output of the scene light integrating circuit of FIG. 5.
Figure 7:
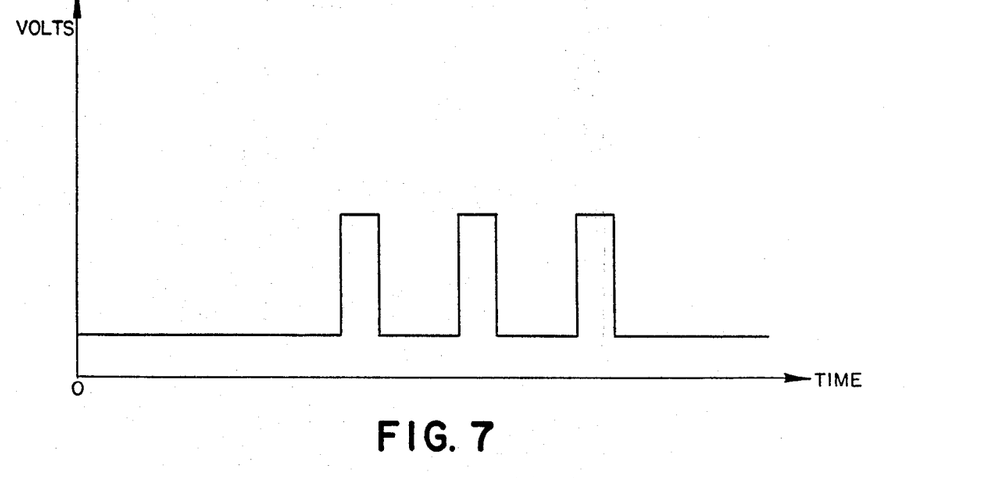
FIG. 7 is a graphical representation showing a digital pulse train output signal from a comparator controlled by the output signal from the light integrator of FIG. 5.

The scene light integrating circuit 60 responds to light incident to the photoresponsive element 62 to provide an integrated output response as shown in FIG. 6. The integrated output response along output line 70 is directed to an input terminal of a comparator 82 which operates to compare the integrated output voltage signal along line 70 with a select reference voltage signal level $V_1$ as derived from an input line 84. When the output voltage signal level from the integrating circuit 60 along line 70 reaches the selected reference signal level $V_1$ along line 84, the comparator 82 switches from a low (binary logic 0) output signal level to an assertive (binary logic 1) output signal level along output line 94 to drive an NPN transistor 86 into saturation and thereby discharge the feedback integration capacitor 66. Additionally, an NPN transistor 87 connected in reverse operating mode is simultaneously turned on to divert current from the photoresponsive element 62. The output signal level from the integrating circuit 60 discharges to a selected voltage value $V_2$ below the selected reference level $V_1$ as shown in FIG. 6 whereupon the comparator 82 switches back to provide a low (binary logic 0) output signal level to turn off the transistor 86 and allow the integration circuit 60 to resume integrating back to the select reference voltage signal level $V_1$. The comparator 82 and light integrating circuit 60 continue to cycle in the aforementioned manner between the selected reference voltage $V_1$ and the selected value below the reference voltage $V_2$ as a result of the hysteresis associated with the comparator 82 to provide a saw tooth output signal along line 70 as shown in FIG. 6. The output signal from the comparator 82 at line 94 approximates a digital pulse train as shown in FIG. 7 whereupon the pulses may be subsequently counted in the manner of this invention as will be subsequently described.

The exposure control circuitry herein described preferably derives power from a battery that is insertable within the camera in correspondence with a film pack or cassette in a manner that is well known in the art for Polaroid SX-70 type film cassettes and cameras. The aforementioned film cassette battery is preferably utilized to power the circuitry in FIG. 5 in its entirety by way of three switches $S_1$, $S_2$, and $S_3$ in a manner as is more fully described in U.S. Pat. No. 4,040,072, supra. The exposure control circuitry of FIG. 5 also includes a motor and solenoid control circuit 72 which operates in a manner as is more fully described in U.S. Pat. No. 4,040,072, supra. As is readily apparent, the motor and solenoid control circuit 72 operates to control the energizing current delivered to the solenoid 48 and to a motor 74. The film units intended for use with the camera of this invention are preferably of the self-developing type, and the motor 74 is provided to effect the advancement and processing of the self-developing film units in a well-known manner.

The photographic apparatus may also include an electronic flash or strobe 76 which is powered and fired in the manner of this invention to be subsequently described herein.

The digital pulse train output at line 94 is directed to an integration counter 92 which is enabled by an all purpose counter 80 to count the individual pulses in the digital pulse train output at line 94 starting at a select time during the exposure cycle in a manner to be more fully described in the following discussion. The all purpose counter 80, in turn, counts the individual pulses from a clock pulse train derived from a clock 104 by way of a frequency divide circuit as shown at 166. The output from the clock 104 is also simultaneously directed to a frequency divide counter 106 which may be decoded in the manner of this invention by a plurality of AND gates 150, 152, and 154 which provide output signals on an OR gate 160. The AND gates 150, 152 and 154 are selectively actuated in the manner of this invention by a film speed selector switch as shown at 130. The OR gate 160 receives an additional input signal from an AND gate 162, one input terminal of which receives the clock pulse train from the clock 104 by way of another frequency divide circuit 164. The output signal from the OR gate 160, in turn, is directed to input the up/down counter 136. The film speed selector switch 130 is also connected to selectively decode the integration counter 92 by way of a plurality of AND gates 142, 144 and 146 in the manner of this invention to be subsequently described herein. The output signals from the AND gates 142, 144, 146 input an OR gate 148, which, in turn, provides an output signal to an exposure and sequence circuit 78 to terminate the exposure in the manner to be herein described.

When the strobe 76 has been fully charged in a well-known manner, the photographer may initiate a photographic exposure cycle by manually actuating a button A so as to close the switch $S_1$ in a manner as is more fully described in U.S. Pat. No. 4,040,072, supra. Closure of the switch $S_1$, in turn, signals the exposure and sequencing circuit 78 in a manner as is fully described in U.S. Pat. No. 4,192,587, supra, to provide a high (binary logic 1) solenoid drive signal along output line SDR to the motor and solenoid control circuit 72 so as to energize the solenoid 48 and retract the plunger 50 inwardly to rotate the walking beam 40 in a counterclockwise direction from its position as shown in FIG. 1 to its position as shown in FIG. 2. This limited clockwise movement of the walking beam 40 operates to effect the release of the previously mentioned latch mechanism (not shown) while simultaneously effecting the closure of the switches $S_2$ and $S_3$ in a manner as is again more fully described in U.S. Pat. No. 4,040,072, supra. Immediately prior to the closure of the switch $S_3$ as is readily apparent, there is provided a low (binary logic 0) signal level along line CLR which signal level is subsequently inverted by an inverter gate 132 to provide a high (binary logic 1) signal level to clear the up/down counter 136 while at the same time resetting a flip-flop 168. In this manner, the up/down counter 136 is cleared with all the output signals therefrom going to low (binary logic 0) output signal levels. The output signal from the Q terminal of the flip-flop 168 also simultaneously goes to a low (binary logic 0) level.

Closure of the switch $S_3$ also operates to signal the exposure and sequencing circuit 78 to provide a logic signal by way of the interconnecting line SHC to the motor and solenoid control circuit 72 to power down the solenoid 48 from its initial high current energization condition required to retract the plunger 50 to a low current energization condition required to temporarily hold the plunger in its retracted position as shown in FIG. 2. The powering down of the solenoid 48 to a holding current mode is accomplished in a manner as is fully described in U.S. Pat. No. 4,192,587, supra, and does not effect the assertive (binary logic 1) output signal level provided from the exposure and sequencing circuit 78 along the output line SDR. Closure of the switch $S_3$ in the aforementioned manner also operates to provide a high (binary logic 1) output signal level to one input terminal of an AND gate 126, in turn, switching the output therefrom to a high (binary logic 1) signal level to input a sonar inhibit circuit 128 so as to remove the inhibit imposed on the sonar rangefinding circuit 16 and allow the sonar rangefinding circuit to issue a transmit commence signal to the sonic transducer 120.

Closure of the switch $S_3$ also operates to provide a high (binary logic 1) signal level to the AND gate 162 thereby enabling the AND gate 162 to gate through a clock pulse train received from the clock 104 by way of the frequency divide circuit 164. The clock pulse train gated through by the AND gate 162 is thereafter gated through by the OR gate 160 to input the up/down counter 136. The up/down counter 136 prior to receipt of an echo signal from the photographic subject 110 by the rangefinder circuit 116 is signalled to operate in an up count mode of operation by the output signal level received from the echo detector 124 which is inverted by an inverter gate 170 to provide a high (binary logic 1) input signal level to the mode select terminal of the counter 136. The high (binary logic 1) signal level from the inverter 170 is also simultaneously directed to the third input terminal of the AND gate 162 so as to enable the AND gate 162 to gate through the clock pulse train in the aforementioned manner. Thus, the AND gate 162 is enabled to gate through the clock pulse train from the clock 104 as divided by the frequency divide circuit 164 to the up/down counter 136 which thereafter proceeds to count up the individual pulses from the clock pulse train in synchronism with the transmission of the ranging signal 122.

Receipt of the echo signal from the photographic subject 110 by the transducer 120 signals the echo detector 124 to provide a high (binary logic 1) output signal level which is subsequently inverted by the inverter gate 170 to provide a low (binary logic 0) output signal level to an input terminal of the AND gate 126 thereby switching the inhibit circuit 128 to provide a sonar ranging inhibit signal. The low (binary logic 0) signal level from the inverter 170 is also simultaneously directed to one input terminal of the AND gate 162 to disable the AND gate 162 from further gating through the clock pulse train received from the frequency divide circuit 164 to the up/down counter 136. The low (binary logic 0) output signal level from the inverter gate 170 also simultaneously operates to change the counter 136 from an up mode of counting to a down mode of counting. Thus, as is now readily apparent, closure of the switch S3 operates to synchronize the transmission of the sonar ranging signal with the initiation of the counter 136 to count up the individual pulses received from the clock 104 by way of the frequency divide circuit 164. Subsequent receipt of the echo from the subject 110 operates to simultaneously terminate the up count by the counter 136 so that the total binary count inputted to the counter 136 corresponds directly to the time between transmission of the sonar ranging signal and receipt of the echo which, in turn, corresponds directly to the camera-to-subject distance range and thus defines the range related time interval. In addition, it will be readily understood that receipt of the echo signal by the echo detector 124 provides as assertive signal to a lens halt system as shown generally at 172 which stops the movement of the objective lens 108 at the appropriate focal position in a manner as is more fully described in U.S. patent application Ser. No. 156,044, entitled "Digital Lens Disc Pawl Release Arrangement", filed in common assignment herewith and now incorporated by reference herein. Under conditions where the photographic subject 110 is located at infinity and no echo signal is received by the transducer 120, the counter 136 fills and thereafter terminates the up count mode of operation in a manner as is fully described in U.S. Pat. No. 4,192,587, supra.

Figure 3:
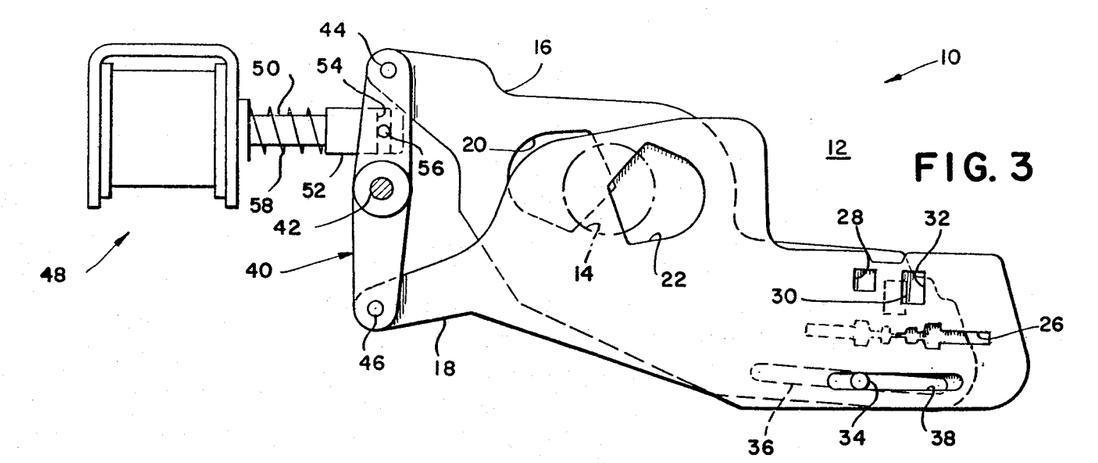
FIG. 3 is a front elevational view showing portions of the exposure control system of FIG. 1 in still a different position.

Subsequent to receipt of the echo signal by the rangefinder 116 or the filling of the counter 136 in the previously discussed manner, the exposure and sequence circuit 78 operates to provide low (binary logic 0) output signals along lines SHC and SDR to signal the motor and solenoid control circuit 72 to deenergize the solenoid 48 and release the shutter blade elements 16 and 18 to move towards the position as shown in FIG. 3 so as to ultimately commence an exposure interval. As is readily apparent prior to the deenergization of the solenoid 48 and subsequent to the closure of the switch S3, either one of the lines SHC or SDR provided a high (binary logic 1) signal level to an OR gate 102 which, in turn, provided a high (binary logic 1) output signal level to clear the all purpose counter 80 and to reset a pair of flip-flops 90 and 98 such that the Q output terminals thereof provide high (binary logic 1) output signal levels and the $\overline{Q}$ terminals thereof provide low (binary logic 0) output signal levels therefrom. The solenoid 48 is deenergized and the shutter blade elements 16 and 18 are released for opening movement when the signal levels along lines SHC and SDR are switched by the exposure and sequence circuit 78 to low (binary logic 0) levels which levels, in turn, operate to switch the OR gate 102 to provide a low (binary logic 0) output signal level to enable the all purpose counter 80 to begin counting the clock pulse train received from the clock 104 by way of the frequency divide circuit 166. In this manner, the all purpose counter 80 is synchronized to start counting generally in correspondence with the initial movement of the shutter blade elements 16 and 18 from the position as shown in FIG. 2 toward the positions as shown in FIGS. 3 and 4.

The exposure and sequence circuit 78 in synchronism with the deenergization of the solenoid 48 operates to provide a pre-exposure ambient scene light brightness measurement in a manner as is fully described in U.S. Pat. No. 4,192,587, supra. Approximately 18 milliseconds subsequent to the deenergization of the solenoid 48 and after the pre-exposure ambient scene light intensity detection operation is completed, a decode signal is provided from the all purpose counter 80 by an AND gate 88 which switches to provide a high (binary logic 1) output signal level to set the flip-flop 90. The flip-flop 90, in turn, switches to provide a high (binary logic 1) output signal level from its Q terminal to enable the integration counter 92 to start counting and at the same time to provide a high (binary logic 1) output signal level to one input terminal of an AND gate 100. The other input terminal to the AND gate 100 is already at a high (binary logic 1) input signal level by virtue of the output received from the $\overline{Q}$ terminal of the flip-flop 98. Thus, the AND gate 100 switches to provide a high (density logic 1) base drive output signal level to drive an NPN transistor 174 into saturation and energize the LED 33. In this manner, the LED 33 is energized immediately prior to the shutter blade elements 16 and 18 reaching the position as shown in FIG. 3 where the exposure interval commences and the scene light is first admitted to the film plane. As is readily apparent, the primary apertures 20 and 22 just begin to overlap to admit scene light to the film plane at about the same time that the photocell sweep secondary apertures 24 and 26 begin to overlap to admit scene light to the photoresponsive element 62.

The first scene light detect apertures 30 and 32 also begin to overlap to admit artificial light from the LED 33 to the photoresponsive element 62 in synchronism with the first since light admitted by the primary apertures 20 and 22 to the film plane. The light detecting and integrating circuit 60 detects and integrates the artificial light from the LED to provide the saw tooth output signal along line 70 as shown in FIG. 6 to the comparator 82. The comparator 82, in turn, provides the output pulse train as shown in FIG. 7 to the integration counter 92 which is enabled to count up by virtue of the (binary logic 1) output signal level received from the $\overline{Q}$ terminal of flip-flop 90. The integration counter 92 is subsequently decoded upon reaching a preselected pulse count by an AND gate 96 which is switched to provide a high (binary logic 1) output signal level to the set terminal of flip-flop 98. The output signal level at the Q terminal from flip-flop 98 is thereby switched to a low (binary logic 0) signal level to switch the AND gate 100 to provide a low (binary logic 0) output signal level, in turn, turning off the transistor 174 and deenergizing the LED 33. The shutter blade elements continue to move toward the maximum aperture defining position as shown in FIG. 4.

The decode of the integration counter 92 by the AND gate to provide a high (binary logic 1) output signal level along line FL signals the commencement of the exposure interval. The high (binary logic 1) output signal level along line FL is subsequently directed to one input terminal respectively of the AND gates 150, 152 and 154. The film speed selector switch 130 is connected to direct a high (binary logic 1) signal level to one input terminal of one of the AND gates 150, 152 and 154 so as to enable the selected AND gate to decode the frequency divide counter 106 at the particular clock pulse train frequency appropriate for the particular film speed. By way of example, it may be assumed that the film speed selector switch 130 is set at its slowest film speed A thereby enabling AND gate 154 to gate through the slowest frequency clock pulse train from the clock 104. The counter 136 thereafter proceeds to count down from its previously registered up count until reaching a binary count which is decoded by the NOR gate 176 to provide a high (binary logic 1) output signal level to one input terminal of the AND gate 178. The counter 136 thus counts down at a rate determined by the film speed selector switch 130. The high (binary logic 1) output signal level from the NOR gate 176 operates to switch the AND gate 178 to provide a high (binary logic 1) input signal level to set a flip-flop 168 and switch the output at the Q terminal thereof to a high (binary logic 1) flash fire trigger signal to the strobe 76 thereby firing its associated flash in a well-known manner.

Thus, the counter 136 by counting down a clock pulse train having a frequency corresponding to a select film speed provides for a range responsive time signal commencing in correspondence with the initiation of the exposure interval and terminating at the lapse of a time period corresponding to the range related time interval and thus the distance between the camera and the subject to be photographed. During the time in which the counter 136 counts down, the shutter blade elements 16 and 18 are driven from their position as shown in FIG. 3 toward their position as shown in FIG. 4 to define progressively increasing effective primary aperture values until reaching the maximum aperture defining position as shown in FIG. 4. Since the total number of clock pulses previously counted up by the counter 16 during the previously mentioned rangefinding operation corresponds directly to the camera-to-subject range, the number of pulses counted down by the counter 136 also corresponds to the camera-to-subject distance range and progressively increase in correspondence with increasing camera-to-subject range thereby progressively increasing the time subsequent to the initiation of the exposure interval in which the flash is fired so as to fire the flash at the appropriate follow focus aperture now corresponding to both the camera-to-subject distance and the film speed. As is now readily apparent under conditions of relatively fast film speed, as shown at C, the frequency divide counter 106 is decoded by the AND gate 150 to input the up/down counter 136 with a relatively fast frequency clock pulse train so as to provide the fastest rate at which the counter 136 can be counted down to insure that the flush is fired at the smallest appropriate follow focus aperture. Conversely, under conditions of relatively slow film speed as shown at A, the frequency divide counter 106 is decoded by the AND gate 154 to input the counter 136 with the slowest frequency clock pulse train so as to provide the slowest rate at which the counter 136 can be counted down to assure that the flash is fired at the largest appropriate follow focus aperture. Thus, there is provided a means by which the follow focus aperture at which the flash is fired may be increased in correspondence with decreasing film speed.

Under conditions of high ambient scene light intensity, the electronic flash 76 preferably provides a proportional fill flash with the ultimate exposure being determined by the scene light detecting and integrating circuit 60 providing a select number of pulses to the integration counter 92. As is now readily apparent, the film speed selector switch 130 not only enables the appropriate decoding of the frequency divide counter 106 but also simultaneously enables the appropriate one of the AND gates 142, 144 and 146 to decode the integration counter 92 at the appropriate pulse count corresponding to the complete film exposure for the selected film speed. Thus, where the film speed selector switch 130 is set for a fast film speed such as C, it can be seen that the integration counter 92 will be decoded by the AND gate 142 at the lowest possible pulse count to provide a high (binary logic 1) output signal level to the OR gate 148 which, in turn, provides a high (binary logic 1) output signal level to the exposure and sequence circuit 78 so as to effect the energization of the solenoid 48 to terminate the exposure interval by displacing the shutter blade elements 16 and 18 from their position as shown in FIG. 4 back to their positions as shown in FIGS. 1 and 2. In this manner, there is provided the shortest possible exposure interval to accommodate for the fastest film speed.

Conversely, where the film speed selector switch 130 is set for a slow film speed such as at A, the AND gate 146 is enabled to decode the integration counter 92 at the highest possible pulse count. The AND gate 146 upon decoding the integration counter 92 also provides a high (binary logic 1) output signal level to the OR gate 148 which, in turn, switches to provide a high (binary logic 1) signal level to the exposure and sequency circuit 78 thereby effecting the energization of the solenoid 48 and the retraction of the shutter blade elements 16 and 18 from their position as shown in FIG. 4 back to their positions as shown in FIGS. 1 and 2 to terminate the exposure interval. In this manner, there is provided the longest possible exposure interval to accommodate for the slowest film speed.

Other embodiments of the invention including additions, subtractions, deletions and other modifications of the preferred disclosed embodiments of the invention will be obvious to those skilled in the art and are within the scope of the claims.

What is claimed is:

1. In a photographic exposure control system for use with a source of artificial illumination and for controlling the exposure of a photosensitive recording medium, the system having a shutter arrangement for at least initially providing progressively increasing aperture values at a predetermined rate during an exposure interval within which scene light is transmitted to the photosensitive medium following actuation of the shutter arrangement, and means for providing a flash fire signal to ignite the source of artificial illumination during the exposure interval at an appropriate follow focus aperture value corresponding to the subject distance, the improvement comprising selectively actuatable means for varying the follow focus aperture at which the flash fire signal is provided in correspondence with different ones of a select plurality of film speeds.

2. In a photographic exposure control system for use with a source of artificial illumination and for controlling the exposure of a photosensitive recording medium, the system having a shutter arrangement for at least initially providing progressively aperture values at a predetermined rate during an exposure interval within which scene light is transmitted to the photosensitive medium following actuation of the shutter arrangement, means for providing a flash fire signal to ignite the source of artificial illumination during the exposure interval, and means for determining the distance of a photographic subject from the system to define a range related time interval corresponding to the subject distance and for producing the flash fire signal responsive to a lapse of a time period commencing at the initiation of the exposure interval and corresponding to the range related time interval to thereby produce the flash fire signal at an aperture value corresponding to the subject distance, the improvement comprising selectively actuatable means for varying the lapsed time period at which the flash fire signal is provided in correspondence with different ones of a select plurality of film speeds.

3. The improvement of claim 2 wherein the means for producing the flash fire signal at the lapse of the time period includes counter means for counting up during the range related time interval corresponding to the subject distance and for counting back down starting at the commencement of the exposure interval to define the lapsed time period and said means for varying the lapsed time period includes means for progressively varying the rate at which the counter means counts back down.

4. The improvement of claim 3 wherein said means for progressively varying the rate at which the counter means counts back down includes a frequency divide counter and means for selecting one of a plurality of different decodes for said frequency divide counter to correspond with one of said select plurality of film speeds.

5. In a photographic exposure control system for use with a source of artificial illumination and for controlling the exposure of a photosensitive recording medium, the system having a shutter arrangement for at least initially providing progressively increasing aperture values at a predetermined rate during an exposure interval within which scene light is transmitted to the photosensitive medium following actuation of the shutter arrangement, means for detecting scene light and for responding to the detection of a select amount of scene light to terminate the exposure interval and means for providing a flash fire signal to ignite the source of artificial illumination during the exposure interval at an appropriate follow focus aperture value corresponding to the subject distance, the improvement comprising selectively actuatable means for varying both the follow focus aperture at which the flash fire signal is provided and the select amount of ambient light to be detected to terminate the exposure interval in correspondence with different ones of a select plurality of film speeds.

6. In a photographic exposure control system for use with a source of artificial illumination and for controlling the exposure of a photosensitive recording medium, the system having a shutter arrangement for at least initially providing progressively increasing aperture values at a predetermined rate during an exposure interval within which scene light is transmitted to the photosensitive medium following actuation of the shutter arrangement, means for detecting scene light and for responding to the detection of a select amount of scene light to terminate the exposure interval and means for determining the distance of a photographic subject from the system to define a range related time interval corresponding to the subject distance and for producing the flash fire signal responsive to a lapse of a time period commencing at the initiation of the exposure interval and corresponding to the range related time interval to thereby produce the flash fire signal at an aperture value corresponding to the subject distance, the improvement comprising selectively actuatable means for varying both the lapsed time period at which the flash fire signal is provided and the select amount of scene light to be detected to terminate the exposure interval in correspondence with different ones of a select plurality of film speeds.

7. The improvement of claim 6 wherein the means for producing the flash fire signal at the lapse of the time period includes counter means for counting up during the range related time interval corresponding to the subject distance and for counting back down starting at the commencement of the exposure interval to define the lapsed time period and wherein said means for varying the lapsed time period includes means for progressively varying the rate at which the counter means counts back down.

8. The improvement of claim 7 wherein the means for detecting ambient scene light and terminating the exposure interval includes a digital light integrator for providing a pluse train output signal corresponding to the detected ambient scene light and an integration counter for counting the number of pulses from said pulse train and wherein said means for varying the select amount of scene light to be detected to terminate the exposure interval includes means for selecting one of a plurality of different decodes for said integration counter to correspond with one of said select plurality of film speeds.

9. The improvement of claim 8 wherein said means for progressively varying the rate at which the counter means counts back down includes a frequency divide counter and means for selecting one of a plurality of different decodes for said frequency divide counter to correspond with one of said select plurality of film speeds.

* * * * *